United States Patent [19]
Reinhart

[11] 3,748,597
[45] July 24, 1973

[54] OPTICAL MODULATORS
[75] Inventor: Franz Karl Reinhart, Summit, N.J.
[73] Assignee: Bell Telephone Laboratories, Incorporated, Murray Hill, N.J.
[22] Filed: Oct. 28, 1971
[21] Appl. No.: 193,286

[52] U.S. Cl................ 333/7.51, 350/150, 350/161, 250/199
[51] Int. Cl............................................. H01s 3/10
[58] Field of Search.................... 332/7.51; 350/150, 350/161; 250/199

[56] References Cited
UNITED STATES PATENTS
3,299,106  1/1966  Lord et al............................ 350/150
3,462,211  8/1969  Nelson et al........................ 350/150
3,242,805  3/1966  Harrick........................... 350/160 R OTHER PUBLICATIONS
Hayashi et al., "GaAs–$Al_xGa_{1-x}As$ Double Hetrostructure Injection Lasers," 4/71, Pg. 1929–1941, J. Appl. Phys., Vol. 42, No. 5.
Reinhart, Electroptic & Waveguide Properties ... P–N junctions 1/15/69, Pg. 1208–1221, Phys. Review, Vol. 177, No. 3.
Folberth, "Semiconductor Element Active as a Light Modulator," 12/7/65, Pg. 1019, IBM Tech. Disc. Bull., Vol. 8, No. 7.

*Primary Examiner*—Benjamin A. Borchelt
*Assistant Examiner*—N. Moskowitz
*Attorney*—W. L. Keefauver and Arthur J. Torsiglieri

[57] ABSTRACT

An optical phase modulator comprises a semiconductive body having first, second and thrid layers, the second layer being contiguous with and intermediate to the first and third layers and being of a material having a bandgap and free carrier concentration lower than that of both of the first and third layers. Optical radiation to be modulated is transmitted through the second layer across which is applied an electric field to effect the modulation. In a preferred embodiment the body and the field are mutually adapted so that a depletion layer is created coextensive with the second layer. Under this condition, the phase modulation per unit power and bandwidth achieves a relative maximum for the fundamental transverse mode. Structures which employ a p-n junction, as well as ones which do not, are disclosed. Optical polarization and intensity modulators are also described.

16 Claims, 9 Drawing Figures

PATENTED JUL 24 1973

OPTICAL MODULATORS

BACKGROUND OF THE INVENTION

This invention relates to optical modulators and more particularly to multilayered semiconductor bodies for use in optical phase, polarization or intensity modulators.

Active research and development of laser technology continues to hurdle long standing obstacles, the most recent of which centered about the first report by I. Hayashi and M. B. Panish of continuous wave operation at room temperature in a new form of semiconductor injection laser termed a double heterostructure — a goal which has been long sought since the advent of the injection laser in the early 1960's. Indeed, the double heterostructure has brought an optical communications system, in which the laser serves as a carrier source, closer to a commercial reality and has stimulated interest in new devices for effectively modulating the laser output in order to impress thereon information to be transmitted.

Various modulation techniques, including for example, phase, polarization and intensity modulation, can be utilized provided a device is available to perform the modulation function efficiently, at low enough power levels, and at high enough rates that a commercially practical communications system is realizable. The state of the art in such modulation devices is summarized by an article appearing in Scientific American, 218, 17 (1968).

Generally speaking, the best prior art phase modulators rely on an electrooptic effect in materials such as $LiNbO_3$ or in devices such as reverse-biased GaP p-n junctions. Both of these modulators typically require 1 – 1.5 $mW/MHz/rad^2$ to phase modulate the 6,328 A line of a He—Ne laser. At longer wavelengths in the infrared, such as the 1.15 $\mu$m line of the He—Ne laser, the power required would be approximately an order of magnitude larger (e.g., 10 mW) and at still longer wavelengths, such as 10.6 $\mu$m, the power required would be more than three orders of magnitude larger (e.g., 2,000–3,000 mW).

Prior art intensity modulators, on the other hand, illustratively employ Faraday rotation in materials such as YIG and typically produce 70 percent modulation for one radian of polarization rotation. Such materials, however, are for practical purposes not useful at longer wavelengths (e.g., 10.6 $\mu$m) due to high absorption losses.

SUMMARY OF THE INVENTION

In accordance with an illustrative embodiment of my invention, an optical modulator comprises a multilayered semiconductor body including first, second and third layers in which the second layer is intermediate to and contiguous with the first and third layers. The second layer, which has a bandgap and carrier concentration lower than that of both the first and third layers, is adapted for the transmission therethrough of optical radiation to be modualted. Preferably, the second layer is either a substantially intrinsic semiconductor or a semiconductor in which the doping is compensated (less than approximately $10^{17}/cm^3$ for GaAs). By intrinsic it is meant that the doping concentration is less than $n_i$, the thermodynamical equilibrium carrier concentration of an undoped idealized semiconductor. By compensated it is meant that the carrier concentration is greater than $n_i$ and that the concentrations of holes and electrons are substantially equal to one another.

Due to the aforementioned difference in bandgap, index of refraction discontinuities are created at the interfaces between the second layer and the first and third layers. These discontinuities effectively confine the radiation to be modulated to the second layer. An electric field applied to the body controls the width of a depletion layer utilized to modulate radiation transmitted through the second layer. Modulation occurs as a result of either and electrooptic effect or a Franz-Keldysh effect.

In order to enhance the modulation efficiency and reduce the power required, the interaction integral between the applied field and the optical field is increased as much as possible by a mutual adaptation of the following: (1) use of different refractive index layers to confine the radiation to be modulated to the second layer, (2) use of a low free carrier concentration semiconductor in the second layer in order to concentrate the applied field in the second layer and, importantly, (3) making the depletion layer coextensive with the second layer.

Modulators so constructed produce significant amounts of modulation at power levels considerably below those heretofore possible. For example, in an illustrative embodiment of my phase modulator the first, second and third layers comprise, respectively, AlGaAs, GaAs and AlGaAs respectively. This device required only 0.1 $mW/MHz/rad^2$, more than 100 times lower than that which would be required by prior art phase modulators at 1.15 $\mu$m.

As will be discussed more fully hereinafter, my optical modulators are preferably fabricated in a mesa-like structure, and/or with a stripe contact geometry, and from materials which are lattice matched between all compositions of solid solutions thereof. Moreover, when incorporated with appropriate polarizers and analyzers, my invention operates as an intensity modulator based on polarization rotation effects. In addition, intensity modulation based on the absorption of radiation near the band edge of the second layer can also be effected efficiently.

BRIEF DESCRIPTION OF THE DRAWING

These and other objects of my invention, together with its various features and advantages, can be easily understood from the following more detailed description taken in conjunction with the accompanying drawing, in which.

DETAILED DESCRIPTION

Figure 1:
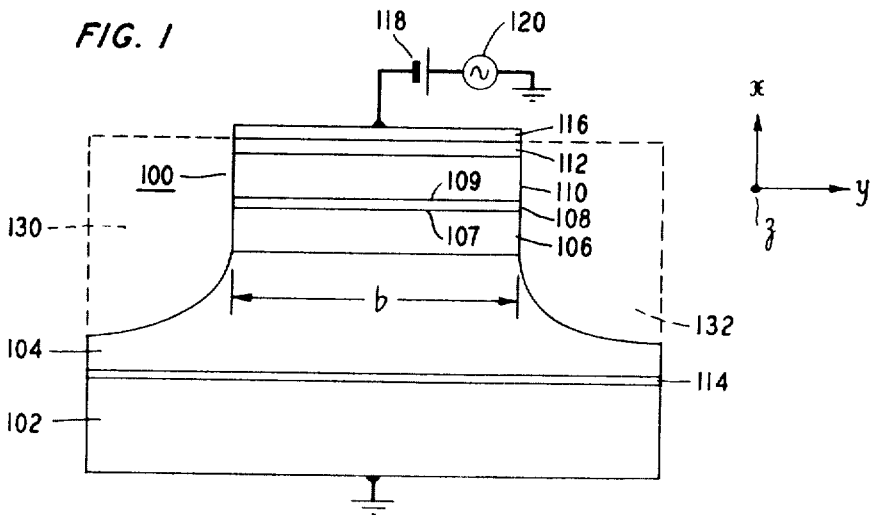
FIG. 1 is a schematic end view of an illustrative embodiment of a semiconductor body for use in my invention.

Turning now to FIG. 1, there is shown a circuit arrangement including a multilayered semiconductor body 100 suitable for use in an optical modulator of the phase, polarization or intensity type. The body 100, which is shown mounted on a metallic or metalized heat sink 102, illustratively comprises a substrate 104 upon which are successively formed the following epitaxial layers: a wide bandgap first layer 106, a relatively narrow bandgap second layer 108, a wide bandgap third layer 110, and a fourth layer 112 for contacting purposes. Contacts 114 and 116 are deposited, or otherwise formed by techniques well known in the art, respectively, on layer 112 and substrate 104 which is bonded to heat sink 102. Alternatively, or additionally, a heat sink could be bonded to contact 116. For modulating purposes, a bias source 118 and an information source 120 are connected between contact 116 and heat sink 102. These sources establish in body 100 an electric field which controls the width of a depletion layer in the second layer 108 as discussed hereinafter.

Figure 2A:
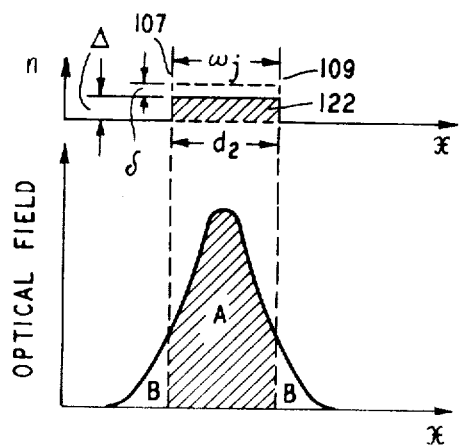
FIG. 2A shows illustrative index of refraction and optical field profiles of the body of FIG. 1 in which the depletion layer is coextensive with the second layer.

The difference in bandgap between the second layer 108 and the first and third layers 106 and 110 produces an index of refraction discontinuity $\Delta$ at each of the interfaces 107 and 109 as shown in FIG. 2A. The electric field of source 120 changes the height of the refractive index step $\Delta$ by an amount $\delta$, thereby producing phase modulation (i.e., the Pockels effect) of light transmitted in the z-direction through layer 108. In addition, the refractive index discontinuities also define a waveguide in the x-direction which serves to confine the light to be modulated. To produce such interfaces which are relatively defect free, it is desirable that the materials of layers 106, 108 and 110 be lattice matched. To this end it is preferable that layers 106, 108 and 110 comprise, respectively, $Al_xGa_{1-x}As$, $Al_yGa_{1-y}As$ and $Al_zGa_{1-z}As$ since AlGaAs is lattice matched for all proportions of Al and Ga in the solid solutions thereof. Alternately, appropriate compositions of $Al_xGa_{1-x}P$, $Al_yGa_{1-y}P$, and $Al_zGa_{1-z}P$ can be utilized since this compound is also expected to be lattice matched. In either case, in order to satisfy the foregoing bandgap relationship it is required that $0 \leq y < x$ and $z$. For a symmetric waveguide $x = z$.

From a radiation wavelength standpoint, note that when $y = 0$ in $Al_yGa_{1-y}As$, the second layer comprises GaAs which has a bandgap of about 1.43 ev (0.87 $\mu$m), and for insertion loss reasons discussed hereinafter, the wavelength of radiation to be modulated is preferably longer than about 0.9 $\mu$m. However, for modulation of visible radiation the Al concentration in the second layer can be made nonzero in which case light at wavelengths as short as about 0.7 $\mu$m can be modulated in AlGaAs. In AlGaP wavelengths as short as about 0.6 $\mu$m can be modulated.

Figure 2B:
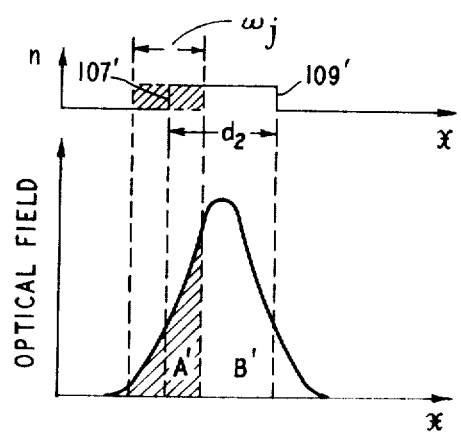
FIG. 2B is similar to FIG. 2A but for a case in which the depletion layer is not coextensive with the second layer.

Several features of the foregoing structure are mutually adapted in order to increase the amount of modulation per unit of modulating power. More specifically, the second layer 108 is fabricated with a free carrier concentration lower than that of either layers 106 or 110, and preferably as low as possible. To effect this characteristic, the second layer is preferably either an intrinsic semiconductor or a compensated semiconductor. The lack of free carriers produces high resistivity which effectively concentrates most of the electric field (from sources 118 and 120) in the second layer and thus enhances the perturbation of its optical parameters (e.g., the refractive index in a phase modulator). Secondly, the interaction between the applied electric field and the optical field of the light being modulated in enhanced by making the depletion layer coextensive with the second layer 108 as shown in FIG. 2A; that is, the width $w_j$ of the depletion layer 22 (FIG. 2A) is made substantially equal to the thickness $d_s$ of second layer 108. In this case the interaction integral is large, where, in a simplistic sense, this integral is related to the ratio of areas $A/(A + B)$ in the lower half of FIG. 2A. Contrast this structure with that shown in FIG. 2B where the depletion layer 122' overlaps interface 107' and is not coextensive with second layer 108. This situation might arise in an n-p-p or p-n-n device in which the p-n junction coincides with interface 107'. In the latter case the interaction integral related to the ratio $A'/(A' + B')$ of FIG. 2B is considerably smaller than $A/(A + B)$ of FIG. 2A.

Figure 2C:
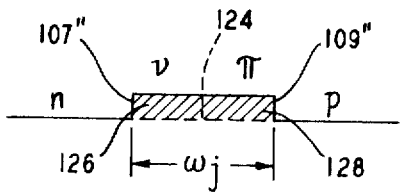
FIG. 2C is also similar to FIG. 2A but for a case in which the second layer comprises $\nu$ and $\pi$ regions.

At this point it should be noted that a p-n junction is not essential to the operation of my modulator. In fact, the conductivity types of layers 106, 108 and 110 are illustratively p-i-p, n-i-n, p-i-n, or n-i-p. Where it is desired to employ a junction, however, then it is preferable that the junction 124, as shown in FIG. 2C, be located in the second layer between the interfaces 107'' and 109'' so that the applied field will cause the depletion layer 122'' to extend until it is coextensive with the second layer. In this case the second layer comprises $\nu$ and $\pi$ type regions 126 and 128 which define the junction 124 at the interface therebetween, where $\nu$ and $\pi$ refer to compensated n- and p-type regions with carrier concentrations less than approximately $10^{17}/cm^3$.

To reduce further the amount of modulation power required, the capacitance of the structure may be reduced by fabricating body 100 in the shape of a mesa as shown in FIG. 1. The mesa may be formed by etching away regions 130 and 132 or by bombarding these regions with high energy particles such as protons. The latter technique will be the subject matter of a patent application to be filed in the names of L. A. D'Asaro, J. C. Dyment, M. Kuhn, and S. M. Spitzer (Case 10–4—6–3) and will be assigned to the assignee hereof.

Figure 3:
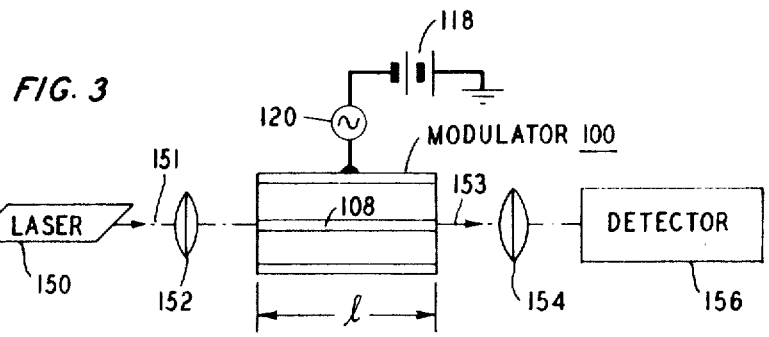
FIG. 3 is a schematic of a phase modulator in accordance with an illustrative embodiment of my invention.

In operation as a phase modulator, my invention relies on a significantly enhanced linear electrooptic effect, commonly known as the Pockels effect. As shown in FIG. 3, the output 151 of a laser 150, which might serve as a carrier source in an optical communication system, is focused through lens means 152 into second layer 108 of body 100. Lens means 152 typically comprises, in combination, a spherical lens and a cylindrical lens which are used to make the beam shape astigmatic so that it conforms to the elongated rectangular shape of layer 108 (as seen in FIG. 1). Information source 120 varies the amplitude of the electric field applied to body 100 in accordance with information to be transmitted, thereby altering the refractive index of the second layer 108 by varying amounts $\delta$ (FIG. 2A). Variations in the refractive index produce phase shifts in the output optical radiation 153 which is focused by lens means 154 onto an appropriate phase detector 156.

Figure 4:
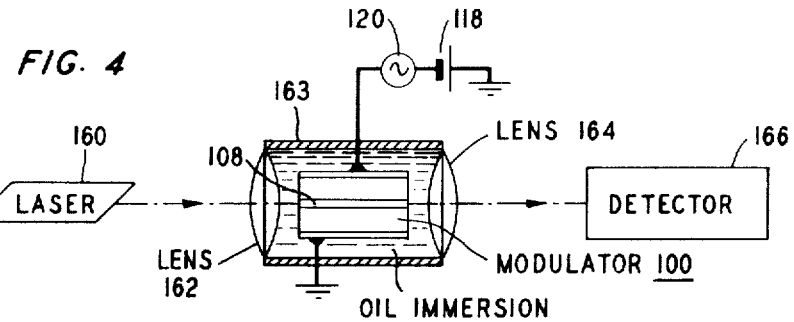
FIG. 4 is a schematic of yet another embodiment of my invention.

In an illustrative example of a phase modulator shown in FIG. 4, the output of a He—Ne laser 160 operating at a wavelength of 1.15 μm was focused through lens means 162 into the second layer 108 of a modulator body 100 which was immersed in oil contained in tank 163. The oil immersion ($n = 1.5$) was used to facilitate focusing the radiation into the second layer by increasing the index of refraction in the region between the lens 162 and the modulator body 100. Reflection losses may be reduced by well known anti-reflection coatings (not shown) formed on the entrance and exit faces of body 100.

The body 100 in this example, which was about 1 mm long ($l$ in FIG. 3) and about 200 μm wide ($b$ in FIG. 1), comprised an n-type GaAs substrate 104 doped with Si to a concentration of $10^{18}/cm^3$ upon which layers 104, 106, 108, 110 and 112 were successively grown by a liquid phase epitaxy technique of the type described by M. B. Panish et al in Metallurgical Transactions, 2, 795 (March 1971). The composition of the epitaxial layers was as follows: first layer 106 (about 8 μm thick) - n-$Al_xGa_{1-x}As$ ($x = 0.3 \pm 0.05$) doped with Sn to a concentration of about $5 \times 10^{17}/cm^3$, second layer 108 (about 0.5 μm thick) - compensated GaAs having a free carrier concentration of about $3 \times 10^{16}/cm^3$ and formed into $\nu$ and $\pi$ regions as shown in FIG. 2C; third layer 110 (about 0.5 μm thick) p-$Al_x Ga_{1-x}As$ ($x = 0.3 \pm .05$) doped with Zn to a concentration of about $5 \times 10^{17}/cm^3$; and contact layer 112 - p-GaAs (about 1.0 μm thick) doped with Ge. A $p^+$-layer (not shown) was formed in layer 112 by a skin diffusion of Zn to alleviate contact problems. No heat sink was utilized in this example since the modulation frequency was low enough that problems of overheating did not arise. In structures similar to the foregoing, depletion layer widths ($w_j$) up to 0.6 μm have been observed — depending on the applied bias voltage, the width of the second layer and the relative carrier concentrations in the first, second and third layers.

In operation, the modulating source 120 in FIG. 4 provided an a.c. signal of about 3.5 volt peak-to-peak at 10 MHz which was added to a −5 volt bias level established by source 118. Illustratively, the magnitude of the bias electric field is about $10^5$ volts/cm and the a.c. field is of the same order of magnitude. The output of a He—Ne laser 160 at 1.15 μm, which was linearly polarized at 45° to the junction electric field, was focused through lens 162 onto the entrance face of body 100; i.e., into layer 108.

Elliptically polarized light characterized by a phase difference $\Delta \phi$ emerged from the exit face of the modulator body 100 and was collimated by a second lens 164 and passed through a well known Ehringhaus or Sénarmont compensator and polarizing filter arrangement (not shown). The polarization modulation was measured by detector 166 either visually, with the aid of an infrared converter, or through a slit positioned at the real image of the exit face and with the aid of a photomultiplier tube. In the latter case a slit was desirable to discriminate against the continuum mode background. The background can also be reduced by proper excitation of the waveguide modes as is well known in the art. With the aid of the oil immersion up to 90 percent of the transmitted light from laser 160 was excited as discrete waveguide modes in the second layer 108 of body 100. In order to obtain such a high-mode excitation efficiency, it is desirable to carefully match and align the incoming focused beam with respect to the waveguide layer 108.

Figure 5:
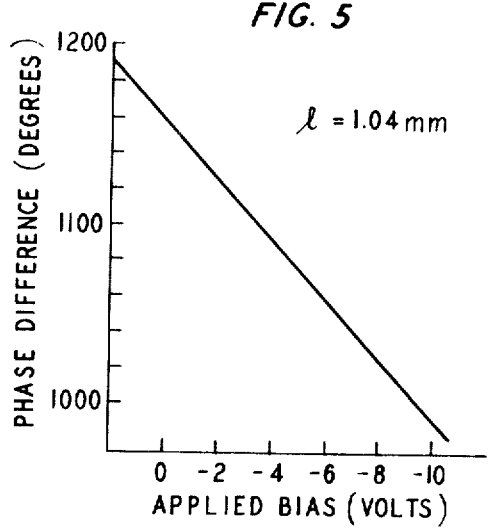
FIG. 5 is a graph of phase difference versus bias voltage for the modulator of FIG. 4.

In FIG. 5 measurements of phase difference ($\Delta \phi$) are shown for the foregoing structure in which $l = 1.04$ mm, the applied field $E_j$ was parallel to the crystallographic [100] direction, and the light ($\lambda = 1.153$ μm) was travelling along the [011] direction. Phase differences of about 1,000° for bias voltages ranging from 0 to −10 volts were observed. In addition, changes in $\Delta \phi$ of about 180° were observed in the same bias voltage range. The large $\Delta \phi$ value at $E_j \approx 0$ is due to the inherently different propagation constants of the TE and TM modes in the waveguide apart from the effects of birefringence.

From a modulation power standpoint, this device required only about 0.1 mW/MHz/rad$^2$ for the fundamental transverse mode at 1.15 μm. Moreover, in the case where waveguiding is in the x-direction only, as in FIG. 1, it can be shown that the characteristic modulation power $P_o \propto CV^2$ is proportional to $l^{-1/2}$ where $C \propto l^{3/2}$ and $V \propto l^{-1}$. However, if waveguiding is provided in both the x- and y-directions, then smaller powers are required because $P_o \propto l^{-1}$, i.e., $C \propto l$ and $V \propto l^{-1}$ and the width in the y-direction ($b$, FIG. 1) can be made as small as a few microns. Consequently, light confinement in the junction plane (y-direction) is highly desirable.

One way in which confinement in the y-direction can be effected is to employ a well-known stripe geometry contact so that the region immediately under the contact is at a higher temperature than regions laterally remote therefrom. Since the refractive index is temperature dependent and the temperature coefficient is positive, the refractive index in the region under the contact will be higher than that in surrounding regions, thereby producing waveguiding in the y-direction. However, the separation of the contact from interface 109 should be relatively shallow (e.g., a few microns) so that excessive current spreading does not result. The latter would undesirably introduce additional capacitance and hence increase $P_o$.

Figure 6:
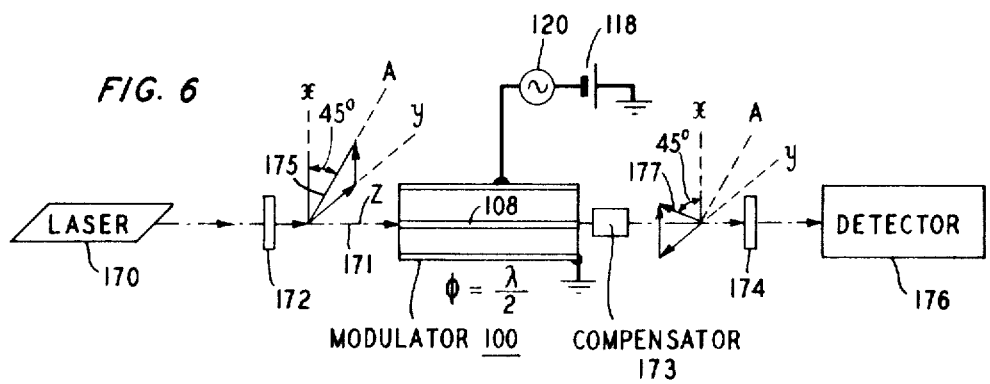
FIG. 6 is a schematic of an intensity modulator in accordance with another illustrative embodiment of my invention.

As shown in FIG. 6, the modulator body 100 can readily be utilized in an intensity modulator using the Pockels effect. More specifically, assume that the x, y and z axes shown coincide with the principal axes of the refractive index ellipsoid of the second layer 108. Then the output beam of laser 170 propagates in the z-direction through polarizer 172 which linearly polarizes the beam in the x-y plane and along axis A at 45° to the x-y axes as shown at 175. For binary modulation, the length of body 100 and the applied voltage are adapted to produce half-wavelength phase retardation. Consequently, in passing through layer 108 polarization of the input beam 171 is rotated 90° as shown at 177. Analyzer 174 effectively transmits light polarized perpendicular to the A-axis but blocks light polarized along the A-axis — thus binary intensity modulation resutls as observed at detector 176. In this arrangement one radian of polarization modulation corresponds to a linearized intensity modulation of 88 percent. In an illustrative intensity modulator actually constructed utilizing the previously described body with $l = 1.04$ mm, a half wave voltage of only 10 volts produced an extinction ratio approaching 20 db. Of course, if this modulator were used in a well-known double pass fashion, an additional reduction of power by a factor of two could be attained. Furthermore, where it is desired to reduce the relatively large amounts of phase difference (e.g., 1,000°, FIG. 5) produced by the modulator, without reducing the swing in phase difference (e.g., 180° FIG. 5), then a compensator 173 may be positioned at the output of the body 100 to subtract out an appropriate amount of phase difference (e.g., 720° so that the total phase difference produced in less than 360°). Illustratively, compensator 173 is a well-known Erhinghaus compensator. In addition, with analyzer 174 removed the preceding embodiment readily operates as a polarization modulator rather than an intensity modulator.

In an alternate embodiment of my intensity modulator, operation is based not on the aforementioned Pockels effect, but rather on the Franz-Keldysh effect. That is, I have found that if the wavelength of the radiation to be modulated is near to and above the band edge of the second layer, then absorption modulation results under the influence of an electric field applied as before. Changes in optical absorption, of course, produce intensity modulation. Illustratively, I have attained greater than 90 percent intensity moudlation with only 6 volts bias for a radiation wavelength of about 0.92 $\mu$m in a modulator body in which the second layer was GaAs (band edge at about 0.87 $\mu$m). Similar effects have been observed in the range 0.87 $\mu$m to 100 $\mu$m. In addition, by adding Al to the second layer the band edge can be changed, thus allowing the modulation of other wavelengths, e.g., those in the visible part of the spectrum.

In either case, however, a trade-off exists between the amount of modulation desired, which dictates that the wavelength should be as near to the band edge as possible, and the amount of optical insertion loss which can be tolerated, which dictates that the wavelength should be above and as far from the band edge as possible. For example, I have estimated the absorption coefficient to be less than about 20 cm$^{-1}$ at 0.90 $\mu$m and less than about 5 cm$^{-1}$ at 0.92 $\mu$m, both in a GaAs second layer 108 of body 100. At 6 volts bias the corresponding intensity modulations for both wavelengths were greater than about 90 percent. Note that if the wavelength were below the band edge the insertion loss might be too high (about 100 cm$^{-1}$) for practical device purposes.

Figure 7:
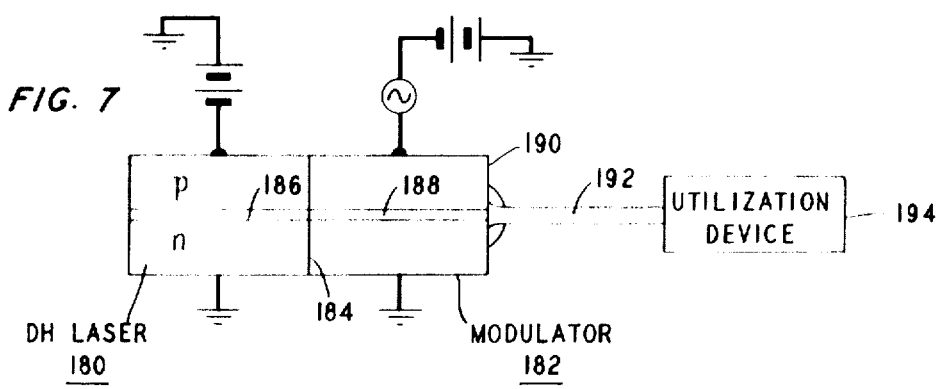
FIG. 7 is a schematic of unitary structure including a double heterostructure laser and a modulator in accordance with still another embodiment of my invention.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention. In particular, the modulator body 100 previously described as a dynamic phase modulator may also be used simply as a static phase plate. In addition, it is readily possible to couple the foregoing modulators to a semiconductor laser in a unitary structure as shown in FIG. 7. Schematically shown are a GaAs-AlGaAs double heterostructure (DH) injection laser 180 of the type described in copending application Ser. No. 33,705 filed on May 1, 1970 of I. Hayashi and a modulator 182 in accordance with my invention, the two being separated from one another by partially transmissive and electrically insulative layer 184. The active region of the DH laser is made coplanar with the second layer 188 of the modulator so that the output of the laser, typically at 0.91 $\mu$m, is coupled directly into the second layer 188 in order to be phase, polarization or intensity modulated, as desired. The modulated radiation emerging from the exit face 190 of modulator 182 is coupled into a light pipe or optical fiber 192 for transmission to a utilization device 194, typically a detector or an amplifier at a repeater station.

What is claimed is:

1. In a device for modulating optical radiation in response to an electric field, a multilayered semiconductor body comprising first, second and third semiconductor layers, said second layer being a high resistivity layer contiguous with an intermediate to said first and third layers and having a bandgap and free carrier concentration lower than that of both said first and third layers, said second layer being adapted for the transmission of said radiation therethrough and being responsive to said electric field applied to said body for modulating said radiation so that said field is substantially concentrated in said second layer.

2. The body of claim 1 wherein said first and third layers are of the same conductivity type and said second layer is intrinsic.

3. The body of claim 1 wherein said first and third layers are of opposite conductivity type and said second layer is intrinsic.

4. The body of claim 1 wherein said first and third layers are of the same conductivity type and said second layer is compensated.

5. The body of claim 1 wherein said first and third layers are of opposite conductivity type and said second layer is compensated.

6. The body of claim 1 wherein said first and third layers are of opposite conductivity type and said second layer comprises contiguous $\nu$ and $\pi$-type regions defining a junction therebetween, said electric field being applied to said second layer in a reverse bias connection.

7. The body of claim 1 wherein said first, second and third layers comprise respectively $Al_xGa_{1-x}R$, $Al_yGa_{1-y}R$ and $Al_zGa_{1-z}R$, where $0 \leq y < x$ and $z$ and R is an element selected from the group consisting of As and P.

8. The body of claim 7 wherein the free carrier concentration in said second layer is less than or equal to approximately $10^{17}$/cm$^3$.

9. The body of claim 1 wherein said electric field includes a d.c. bias field which extablishes a depletion layer in said second layer and wherein the amplitude of said bais field and the relative carrier concentrations in said layers are mutually adapted so that said depletion layer is substantially coextensive with said second layer.

10. The body of claim 1 wherein a portion of each of said layers is etched away to form a mesa-like configuration of the remaining portions of said layers.

11. The body of claim 1 wherein a portion of each of said layers is bombarded with protons to form a mesa-like structure of the remaining portions of said layers.

12. The body of claim 1 including a pair of electrical contacts across which said field is applied, at least one of said contacts having a stripe geometry so that the temperature of a first region of said second layer immediately beneath said stripe contact is higher than that of other regions of said second layer laterally displaced from said first region and contiguous therewith, thereby to cause the index of refraction in said first region to be greater than that in said other regions.

13. A device for modulating the intensity of optical radiation propagating along a transmission path comprising
   a polarizer and an analyzer disposed in said path in sapced relation to one another, and
   a semiconductor body according to claim 1 disposed in said path between said analyzer and said polarizer so that said second layer is positioned to receive said radiation for transmission therethrough,
   said polarizer being oriented to linearly polarize said radiation at approximately 45° to two of the principal axes of the refractive index ellipsoids of said second layer,
   said body being adapted to produce half wave phase retardation of said polarized radiation.

14. The body of claim 1 wherein said second layer is characterized by a band edge at a characteristic energy and wherein the wavelength of said radiation corresponds to an energy below and near to said band edge, said electric field being effective to shift said band edge in accordance with the amplitude of said field thereby to alter the optical absorption in said second layer and to intensity modualte said radiation.

15. A unitary device comprising
   a double heterostructure injection laser having a pair of wide bandgap layers of opposite conductivity type, a narrower bandgap active region layer disposed between said pair of layers, and at least one partially transmissive surface normal to said active region, and
   a semiconductor body according to claim 1 having at least one surface normal to said second layer contiguous with and electrically insulated from at least one of said partially transmissive surfaces of said laser, said second layer of said body being coplanar with and optically coupled to said active region layer of said laser.

16. An optical modualtor comprising
   a heat sink,
   a multilayered semiconductor body mounted on said heat sink and comprising
   a semiconductor substrate,
   a plurality of semiconductor layers epitaxially grown on said substrate in the following order: an $Al_x Ga_{1-x}As$ layer, $x > 0$, an $Al_y Ga_{1-y}As$ layer $0 \leq y < x$, an $Al_z Ga_{1-z}As$ layer, $z > 0$ and $y < z$, and a GaAs layer,
   a pair of electrical contacts, one formed on said substrate and one on said GaAs layer,
   the free carrier concentration of said $Al_y Ga_{1-y}As$ layer being lower than that of both said $Al_x Ga_{1-x}As$ and $Al_z Ga_{1-z}As$ layers and being less than or equal to approximately $10^{17}/cm^3$,
   means for applying a d.c. electric field across said contacts so that a depletion layer is established coextensive with said second layer, and
   an information source connected across said contacts for applying to said body an a.c. electric field which varies in amplitude in accordance with information to be transmitted,
   said second layer being adapted for the transmission of said radiation therethrough, the refractive index of said second layer being responsive to changes in the amplitude of said a.c. electric field for phase modulating said radiation, said field being substantially concentrated in said second layer.

* * * * *

Disclaimer 3,748,597.—*Franz Karl Reinhart*, Summit, N.J. OPTICAL MODULATORS. Patent dated July 24, 1973. Disclaimer filed Aug. 10, 1973, by the assignee, *Bell Telephone Laboratories, Incorporated*.

Hereby enters this disclaimer to claims 1 through 8, 10 through 13, and 15 of said patent.

[*Official Gazette December 4, 1973.*]